(12) United States Patent
Oroskar et al.

(10) Patent No.: US 8,802,843 B2
(45) Date of Patent: Aug. 12, 2014

(54) TAGATOSE PRODUCTION USING SIMULATED MOVING BED SEPARATION

(75) Inventors: Anil R. Oroskar, Oak Brook, IL (US); Omkar M. Kulkarni, Naperville, IL (US); David W. House, Arlington Heights, IL (US); Deepak Sharma, Naperville, IL (US); Rakesh Vikraman Nair Rema, Downers Grove, IL (US)

(73) Assignee: OROCHEM Technologies, Inc., Naperville, IL (US)

( * ) Notice: Subject to any disclaimer, the term of this patent is extended or adjusted under 35 U.S.C. 154(b) by 137 days.

(21) Appl. No.: 13/506,889

(22) Filed: May 22, 2012

(65) Prior Publication Data

US 2013/0317210 A1    Nov. 28, 2013

(51) Int. Cl.
 *C07H 1/06* (2006.01)
 *C07H 1/08* (2006.01)

(52) U.S. Cl.
 USPC ........................................................ 536/127

(58) Field of Classification Search
 None
 See application file for complete search history.

(56) References Cited

U.S. PATENT DOCUMENTS

| | | |
|---|---|---|
| 2,985,589 A | 5/1961 | Broughton |
| 4,359,430 A | 11/1982 | Heikkilaeet |
| 4,412,866 A | 11/1983 | Schoenrock |
| 4,880,920 A | 11/1989 | Chang |
| 5,002,612 A | 3/1991 | Beadle |
| 5,008,189 A | 4/1991 | Oroskar |
| 5,078,796 A | 1/1992 | Beadle et al. |
| 5,102,553 A | 4/1992 | Kearney |
| 5,176,832 A | 1/1993 | Dorta |
| 5,466,294 A | 11/1995 | Kearney |
| 6,057,135 A | 5/2000 | Ibrahim |
| 6,093,326 A | 7/2000 | Heikkilaeet |
| 6,187,204 B1 | 2/2001 | Heikkilaeet |
| 6,379,554 B1 | 4/2002 | Kearney |
| 6,451,123 B1 | 9/2002 | Saska |
| 6,896,811 B2 | 5/2005 | Heikkilaeet |
| 6,911,565 B2 | 6/2005 | Heikkilaeet |
| 6,991,923 B2 | 1/2006 | Bertelsen et al. |
| 7,125,455 B2 | 10/2006 | Costesso et al. |
| 7,662,234 B2 | 2/2010 | Costesso et al. |
| 7,722,721 B2 | 5/2010 | Heikkilaeet |
| 7,931,751 B2 | 4/2011 | Costesso |
| 2003/0022844 A1 | 1/2003 | Bertelsen et al. |
| 2003/0222021 A1 | 12/2003 | Ennelin |
| 2005/0188912 A1 | 9/2005 | Unno |
| 2010/0234587 A1 | 9/2010 | Vagnoli |
| 2013/0081613 A1 | 4/2013 | Xu |

OTHER PUBLICATIONS

CN 102296129A, published Dec. 28, 2011, machine translation.*
Fredrick J. Bates & Associates, "Polarimetry, Saccharimetry and the Sugars", May 1, 1942, pp. 632-636, Circular of the National Bureau of Standards C440, Washington, D.C.
International Search Report and Written Opinion for corresponding international application No. PCT/US2013/041853, dated Aug. 23, 2013.

* cited by examiner

*Primary Examiner* — Layla Bland
(74) *Attorney, Agent, or Firm* — Richard P. Silverman & Assoc, LLC (57) ABSTRACT

Disclosed is a process for the production of d-tagatose from lactose after acid hydrolysis to provide a hydrolysate having 1 equiv of d-glucose and 1 equiv of d-galactose for each unit of lactose converted. More particularly, the invention relates to a process for the isomerization of d-galactose to d-tagatose and the use of a simplified separation scheme based on simulated moving bed (SMB) separation. The isomerization of d-galactose to d-tagatose is carried out in the presence of calcium oxide or calcium hydroxide. The process is useful for providing a simplified processing route to providing pure d-tagatose and glucose as two products from lactose hydrolysate. In an alternate embodiment, a process is disclosed for the production of d-tagatose from fermented lactose hydrolysate to provide a crystallized d-tagatose product. D-tagatose is useful as a food additive, as a sweetener, as a texturizer, as a stabilizer, or as a humectant.

23 Claims, 5 Drawing Sheets

TAGATOSE PRODUCTION USING SIMULATED MOVING BED SEPARATION

FIELD OF THE INVENTION

This invention concerns generally with a process for the production of d-tagatose from d-galactose. More particularly, it relates to a process for the isomerization of d-galactose to d-tagatose and the use of a simplified separation scheme based on simulated moving bed (SMB) separation. Further, it relates to the use of an ion exclusion SMB separation unit for recovering d-galactose and glucose from lactose hydrolysate in combination with one or more SMB separation units and an isomerization step for recovering d-tagatose.

BACKGROUND

D-galactose is a monosaccharide, which is mostly found in the milk sugar or lactose, where galactose is bound to d-glucose. D-galactose has the following structure:

In some sour milk products, lactose has been decomposed into glucose and galactose. D-galactose has many applications in the pharmaceutical field and in food technology. In the pharmaceutical field, galactose is useful for example as a pharmaceutical intermediate for several medicines. Furthermore, d-galactose is also useful as a stabilizer in intravenous solutions for medical use. In food technology, d-galactose has been found useful for example as a potential energy source in sports drinks. D-galactose is also useful in cell culture media as a nutrient or as an inducer in fermentation processes. D-galactose is typically obtained by hydrolyzing lactose (a disaccharide consisting of glucose and galactose), which is found in dairy products, such as milk.

It is known in the art to recover d-galactose from various plant-based raw materials using methods selected, for example, from extraction, hydrolysis and treatment with adsorbents and cation and anion exchangers, followed by crystallization. Chromatographic methods for the recovery of d-galactose-containing solutions from plant-based materials are also known in the art.

D-tagatose is a ketohexose having the following structure:

D-tagatose may be formed from d-galactose by enzymatic isomerization. Typically, the isomerization is carried out in the presence of L-arabinose isomerase under alkaline conditions in the presence of calcium. D-tagatose is useful as a food additive, as a sweetener, as a texturizer, as a stabilizer, or as a humectant. D-tagatose is also useful in formulating dietic foods with a low glycemic index. Potential applications of d-tagatose include breakfast cereals, diet soft drinks, reduced fat ice cream, hard and soft candies, chewing gums, dietary supplements, and special diet food for meal replacement.

D-tagatose is typically produced in a two-step process wherein lactose is enzymatically hydrolyzed to d-Galactose and d-glucose using immobilized lactase. The d-galactose is typically separated using a cation exchange resin. The separated d-galactose is then isomerized to produce d-tagatose under alkaline conditions (typically at a pH of 12) using calcium hydroxide to form a precipitate. The precipitate is subsequently treated with sulfuric acid to free the d-tagatose, and the filtrate is demineralized in a cation and anion exchanger. Typically, the resulting solution is concentrated and purified by chromatic fractionation using a cation exchanger. The d-tagatose is recovered by crystallization.

Simulation of a moving sorbent bed is described in U.S. Pat. No. 2,985,589 (Broughton et al.), which is mentioned above. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be imply described as dividing the bed into series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

U.S. Pat. No. 4,412,866 describes an example of the operation of chromatographic simulated moving bed (or sometimes called "SMB") method to separate the components of a feed stock. A resin bed is divided into a series of discrete vessels, each of which functions as a zone within a circulation loop. A manifold system connects the vessels and directs, in appropriate sequence to (or from) each vessel, each of the four media accommodated by the process. Those media are generally referred to as feed stock, eluent, extract and raffinate, respectively. As applied to a sugar factory, a typical feed stock is a lower purity sucrose solution, the eluent is water, the extract is an aqueous solution of sucrose and the raffinate is an aqueous solution containing non-sucrose, such as salts and high molecular weight compounds. The simulated moving bed disclosed by the '866 patent is of the type sometimes referred to as a "continuous SMB."

An example of a batch chromatographic method for the purification of sucrose is described in the disclosure of U.S. Pat. No. 4,359,430, which utilizes sucrose feedstocks derived from sugar beets at purities of approximately 7% to 60% sucrose. See also, e.g., U.S. Pat. No. 5,466,294, which utilizes a "soft raw syrup" as a feedstock to a chromatographic method which is not in a high purity form at a less than 89% purity sucrose on a dry solids basis, i.e., approximately 11% non-sucrose impurities.

U.S. Pat. No. 6,057,135 discloses a method of producing d-tagatose from lactose hydrolysate, comprising glucose and d-galactose. The method comprises subjecting the lactose hydrolysate to fermentation conditions whereby the glucose is selectively fermented to ethanol. The remaining d-galactose is separated from the ethanol to provide a solution having a concentration of from about 10% to about 60% by weight d-galactose. The solution of d-galactose is subjected to enzymatic isomerization with L-arabinose isomerase at an isomerization pH from about 5.5 to about 7.0 and a temperature from about 50° C. to about 70° C. The resulting yield of d-tagatose is from about 20% to about 45% by weight based on d-galactose.

U.S. Pat. No. 7,931,751 discloses a method for purifying already high purity sucrose using a simulated moving bed chromatographic wherein a strong acid cation resin is employed as the stationary phase and water is used as the mobile phase desorbent or chromatographic eluent. The method is disclosed to separate the relatively small qualities of non-sucrose impurities and produce a waste stream which is sufficiently low in solids that it can be sent directly to water disposal facilities with little or no concentration required.

Methods are sought for the separation of a mixture of sugars where more than one of the sugars can be produced as a product stream.

Methods are sought for a more efficient method of producing d-tagatose from lactose hydrolysate.

SUMMARY OF THE INVENTION

Applicant's invention relates to the production of d-tagatose from lactose hydrolysate. Applicant discovered that d-tagatose can be efficiently and selectively produced by the isomerization of d-galactose in the presence of calcium oxide. Because the galactose isomerization reaction to d-tagatose occurs rapidly in the presence of calcium oxide or calcium hydroxide, the reaction must be moderated to maximize the production of the d-tagatose while minimizing the degradation of the d-tagatose to less valuable byproducts. Therefore, at an appropriate point in the isomerization reaction, the reaction mixture is neutralized with a dilute hydrochloric acid stream to provide a pH of between about 6 to about 7 to stop the isomerization reaction. At the conclusion of the isomerization reaction, the calcium oxide is converted to calcium chloride, which is subsequently removed in an ion exclusion simulated moving bed SMB zone.

In one embodiment, the invention is a process for the production of high purity d-tagatose and high purity d-glucose from a lactose hydrolysate stream. The process comprises:

a. passing the lactose hydrolysate stream comprising d-galactose, d-glucose, lactose, disaccharides, water and salts to an ion exclusion SMB zone containing a plurality of ion exclusion beds containing an ion exclusion stationary phase agent selective for the adsorption of d-galactose and d-glucose and operated in an ion exclusion cycle to provide a first extract comprising d-galactose, d-glucose and water, and a first raffinate stream comprising lactose, disaccharides, water and salts;

b. passing the first extract stream to a second SMB zone containing a plurality of galactose separation beds containing a galactose stationary phase agent selective for the adsorption of d-galactose and d-glucose and operated in a galactose adsorption cycle at effective galactose/glucose separation conditions to provide a second extract stream comprising d-galactose, d-glucose, and water, and a high purity glucose product stream comprising d-glucose, d-galactose, and water;

c. passing the second extract stream to a galactose isomerization zone and therein contacting the second extract stream with calcium oxide and calcium chloride at effective isomerization conditions to isomerize at least a portion of the d-galactose to d-tagatose and to provide a galactose isomerate stream comprising d-tagatose, d-galactose, d-glucose, calcium hydroxide, calcium oxide and water;

d. neutralizing the galactose isomerate stream with an effective amount of dilute hydrochloric acid to stop the isomerization and to convert at least a portion of the calcium oxide to calcium chloride and to provide a neutralized galactose isomerate stream comprising d-tagatose, d-galactose, d-glucose, calcium chloride and water;

e. passing the neutralized galactose isomerate stream to a third SMB zone containing a plurality of tagatose separation beds containing a tagatose stationary phase agent selective for the adsorption of d-tagatose and operated in a tagatose adsorption cycle at effective tagatose separation conditions to provide a pure d-tagatose product and a third raffinate comprising glucose, calcium chloride and water; and, f. returning at least a portion of the third raffinate stream to the ion exclusion SMB zone to reject the calcium chloride with the salts in the first raffinate stream.

In a further embodiment, the invention is a continuous SMB process for the production of d-tagatose. The process comprises:

a. passing a lactose hydrolysate stream comprising water, d-galactose, d-glucose, lactose, disaccharides, and salts to an ion exclusion SMB zone containing a plurality of adsorbent beds comprising a strong acid cation calcium exchange resin adsorbent, to provide a first extract stream comprising water, d-galactose and glucose and an ion exclusion raffinate stream comprising lactose, disaccharides, water and salts;

b. passing the first extract stream to a second SMB zone containing a plurality of adsorbent beds comprising a strong acid cation calcium exchange resin adsorbent to provide a second extract stream comprising substantially pure d-galactose, water, and a minor portion of d-glucose, and to provide a glucose product stream comprising substantially pure d-glucose, water, and a minor portion of d-galactose;

c. passing the second extract stream to an isomerization zone to isomerize at least a portion of the d-galactose to d-tagatose in the presence of calcium oxide and calcium chloride at a pH of between about 12 and 13, an isomerization temperature of between about 9° C. and about 14° C., and in a d-galactose/calcium oxide molar ratio of from 1.1:1 to 1:1.1 to provide an isomerate stream comprising water, d-tagatose, d-galactose, glucose, calcium oxide and salts;

d. neutralizing the isomerate stream to a pH of between about 6 and about 7 with a dilute hydrochloric acid stream to provide a neutralized isomerate stream comprising water, d-tagatose, d-galactose, glucose, calcium chloride and salts;

e. passing the isomerate stream to a first concentration zone to remove at least a portion of the water to provide a first concentrated stream;

f. passing the first concentrated stream to a third SMB zone containing a plurality of adsorbent beds comprising a strong acid cation calcium exchange resin adsorbent to provide a substantially pure d-tagatose product stream comprising d-tagatose, water, and a minor portion of d-galactose and a third raffinate stream comprising water, d-galactose, glucose, and salts;

g. passing at least a portion of the third raffinate stream to a second concentration zone to provide a second concentrated stream; and, h. combining the second concentrated stream with the lactose hydrolysate stream prior to passing the lactose hydrolysate stream to the ion exclusion SMB zone.

In a still further embodiment, the invention is a process for producing a pure d-tagatose crystal product from a feed stream of fermented lactose hydrolysate comprising lactose, d-galactose, glycerol, other sugars, and salts. The process comprises:

a. passing the feed stream to an ion exclusion SMB zone comprising a plurality of adsorbent columns containing a strong acid cation stationary phase and operating in a 2-3-2-2 SMB cycle with water as a desorbent to provide a first extract stream comprising water, d-galactose and glycerol, and a first raffinate stream comprising lactose, water, other sugars, and salts;

b. passing the first extract stream to a second evaporation zone to provide an evaporated first extract stream having a Brix value of between about 15 and about 20 and passing the evaporated first extract stream to an isomerization zone containing calcium oxide or calcium hydroxide to provide an isomerized reactor mixture;

c. passing the isomerized reactor mixture to a second SMB zone comprising a plurality of adsorbent columns containing a strong acid cation calcium exchange resin stationary phase and operating in a 2-3-2-2 SMB cycle with water as a desorbent to provide a second extract stream comprising substantially pure d-tagatose, water, and glycerol and a second raffinate stream comprising substantially pure d-galactose, water, salts and a minor portion of d-tagatose;

d. passing the second extract stream to a third evaporation zone to provide a d-tagatose syrup having a Brix value of 60-65 and passing the d-tagatose syrup to a tagatose crystallizer to provide a pure d-tagatose crystal product and a mother liquor comprising d-tagatose and glycerol;

e. passing the mother liquor to glycerol removal zone to remove glycerol to provide a glycerol free tagatose recycle stream;

f. returning at least a portion of the glycerol free tagatose recycle stream to be admixed with the isomerized reactor mixture; and, g. returning at least a portion of the second raffinate to a first concentration zone to provide a concentrated second raffinate stream and admixing the concentrated second raffinate stream with the feed stream prior to passing the feed stream to the first SMB zone.

BRIEF DESCRIPTION OF THE DRAWINGS

The following drawings are illustrative of the embodiments of the invention and are not meant to limit the scope of the invention in any way.

DETAILED DESCRIPTION OF THE INVENTION

Feedstock

Lactose is a disaccharide that occurs naturally in both human and cow's milk. The structure of lactose is shown hereinbelow:

Following acid hydrolysis the resulting lactose hydrolysate comprises a 50/50 mixture of d-glucose and d-galactose and salts. Like maltose, lactose is a reducing sugar. It exhibits muta-rotation and is a 1,4'-beta-linked glycoside. Unlike maltose, however, lactose contains two different monosaccharide units. Acidic hydrolysis of lactose yields 1 equiv of d-glucose and 1 equiv of d-galactose; the two are joined by a beta-glycoside bond between C1 of galactose and C4 of glucose. In other words, 600 g of lactose will produce 300 g each of galactose and glucose.

In the separation processes of the instant invention, chromatographic separation systems are used to separate d-galactose from d-glucose, and to separate d-tagatose from mixtures of d-tagatose, d-galactose, and d-glucose. The chromatographic separator may include a batch type operation or the generally more efficient simulated moving bed operation, and operated using continuous internal recirculation. Examples of simulated moving bed processes are disclosed, for instance, in U.S. Pat. No. 6,379,554 (method of displacement chromatography); U.S. Pat. No. 5,102,553 (time variable simulated moving bed process), U.S. Pat. No. 6,093,326 (single train, sequential simulated moving bed process); and U.S. Pat. No. 6,187,204 (same), each of the contents of the entirety of which is incorporated herein by this reference.

The SMB system of the current invention was arranged for maximum selectivity. The simulated moving bed operation is achieved by use of a plurality of adsorbent beds connected in series and a complex valve system, whereby the complex valve system facilitates switching at regular intervals the feed entry in one direction, the mobile phase desorbent entry in the opposite direction, while changing the extract and raffinate takeoff positions as well. The SMB system is a continuous process. Feed enters and extract and raffinate streams are withdrawn continuously at substantially constant compositions. The overall operation is equivalent in performance to an operation wherein the fluid and solid are contacted in a continuous countercurrent manner, without the actual movement of the solid, or stationary phase adsorbent.

The operation of the SMB system is carried out at a constant temperature within the adsorbent bed. Preferably, the SMB zones of the present invention operate at an SMB temperature of about 50° C. to about 65° C. More preferably, the SMB zones of the present invention operate at an SMB temperature of between about 55° C. to about 60° C. The feed stream is introduced and components are adsorbed and separated from each other within the adsorbent bed. A separate liquid, the mobile phase desorbent, is used to counter currently displace the feed components from the pores of the stationary phase adsorbent. During the SMB cycle of the present invention, adsorbent beds are advanced through a desorption zone, a rectification zone, an adsorption zone, and a regeneration zone. The description of the SMB cycle as a 2-3-3 cycle means that in the cycle, 2 adsorbent beds are in the rectification zone, 3 adsorbent beds are in the rectification zone, and 3 adsorbent beds are in the adsorption zone.

The present invention is based on the integration of simulated moving bed separation with d-galactose isomerization to provide a process which can produce pure d-tagatose from lactose hydrolysate while also providing a pure d-glucose product. It was noted that isomerization of d-galactose to d-tagatose could be carried out in the presence of calcium oxide and calcium chloride. However, when this isomerization was carried out in a plug flow reactor with a feed comprising a 50/50 weight ratio of d-galactose/d-glucose at 25° C. and a pH of 12, the reaction reached a 56% conversion of d-galactose and provided a yield of d-tagatose of 74.7 wt-% of sugar in a reactor residence time of 5 minutes. A reactor residence time of 5 minutes was too short for commercial operations. Furthermore, d-tagatose was found to degrade to other less valuable by products when the residence time approached 10 minutes. Using a CSTR (Continuous Stirred Tank Reactor) for the d-galactose isomerization to d-tagatose in the presence of calcium oxide and calcium chloride permitted the extension of the reactor residence time to between about 240 and 270 minutes, or less than about 3 hours. It was discovered that it was critical to maintain the pH of the CSTR at a pH greater than about 12.0, while maintaining the isomerization temperature between about 9° C. and less than or equal to 16° C., the conversion of the d-galactose to d-tagatose was above 70 weight percent, the yield of d-tagatose was greater than 77 weight percent, and the loss of sugar by conversion to by products was between about 4.8 to 5.7 weight percent. More preferably, the isomerization temperature is maintained between about 9° C. and about 14° C. When the isomerization temperature was increased slightly to 20° C., the conversion of d-galactose increased to 96.0 weight percent, but the losses to by product production increased to 18 weight percent. Furthermore, the molar ratio of d-galactose to calcium oxide in the CSTR is required to be between about 2:1 to 1:2. More preferably, the molar ratio of d-galactose to calcium oxide should be between about 1.1:1 and 1:1.1. The isomerization takes place at basic conditions such as a pH of greater than or equal to 12. More preferably, the isomerization takes place at basic conditions such as a pH of from 12.8 to about 13.0. The isomerization reaction is terminated or controlled by the neutralization of the reaction mixture by the addition of dilute hydrochloric acid, which converts calcium oxide to calcium chloride. It was discovered that the isomerization reaction could be stopped introduction of a dilute aqueous solution of hydrochloric acid (37% by weight) in an amount equivalent to a molar amount of calcium present in the reaction.

According to the invention, lactose hydrolysate is passed to a first SMB zone for ion exclusion to provide a first extract stream comprising d-galactose and d-glucose mixture in water and a first raffinate stream comprising water, lactose, and salts such as calcium chloride. The first extract stream was passed to a second SMB zone to provide a second extract stream comprising substantially pure d-galactose (i.e., 90-99 wt % of d-galactose, based on sugar, and the remainder being a minor portion of d-glucose) and a second raffinate stream or d-glucose product stream comprising substantially pure d-glucose (i.e., 90-99% pure d-glucose and a minor portion of d-galactose, d-galactose). The second extract stream may be concentrated to a d-galactose concentration of between about 90 and about 99 wt-% of total sugar in the stream and passed to a d-tagatose isomerization zone. A number of different concentrations of the second extract stream concentration value based on the level of d-galactose/glucose mixtures in water were evaluated. It was found that as the concentration of the total sugar in the feed to the d-tagatose isomerization zone, or second d-galactose/glucose mixture, approached a concentration of 20 to 25 Brix (A measurement of the dissolved sugar-to-water mass ratio of a liquid, where 20 Brix is equivalent to 20 grams of sugar in 80 grams of water), and the molar ratio of total sugar in the solution to calcium is between 1.1:1 and 1:1.1, the isomerization reaction mixture would form a gel. To avoid formation of a gel in the d-tagatose isomerization reactor, the feed to the d-tagatose isomerization zone should range from about 10 to about 15 Brix. The second extract stream is passed to the d-tagatose isomerization zone to provide a galactose isomerate stream comprising d-tagatose and d-glucose. The galactose isomerate stream is neutralized with a dilute hydrochloric acid stream to at least partially convert calcium hydroxide to calcium chloride. The galactose isomerate is passed to a third SMB zone to separate the galactose isomerate stream to provide a tagatose extract stream comprising substantially pure d-tagatose (i.e., at least 90-99 wt-% pure d-tagatose of sugar) and a minor portion of d-galactose with a recovery of between about 95 to 90 weight percent. Following the separation of the d-tagatose product from the isomerate stream in the third SMB zone, the third raffinate comprising d-galactose, d-glucose and calcium chloride is returned to the first SMB zone for the rejection of the calcium chloride from the system.

In a still further embodiment, the invention is process for producing a pure d-tagatose crystal product from a feed stream of fermented lactose hydrolysate comprising d-galactose, glycerol, lactose, other sugars, and salts. The process comprises passing the feed stream to an ion exclusion SMB zone which comprises a plurality of adsorbent columns. Each of the adsorbent columns contains a strong acid cation exchange stationary phase and is operated in a 2-3-2-2 SMB cycle, with water as a desorbent. The ion exclusion SMB zone provides a first extract stream comprising water, d-galactose and glycerol, and a first raffinate stream comprises water, lactose, other sugars, and salts. The first extract stream is passed to a second concentration zone to provide a concentrated first extract stream having a Brix value of between about 15 and about 20. The evaporated first extract stream is passed to an isomerization zone containing calcium oxide or calcium hydroxide and calcium chloride to provide an isomerized reactor mixture. The isomerized reactor mixture is passed to a second SMB zone which comprises a plurality of adsorbent columns. Each of the adsorbent columns of the second SMB zone contains a strong acid cation exchange stationary phase and is operated in a 2-3-2-2 SMB cycle with water as a desorbent to provide a second extract stream comprising substantially pure d-tagatose (i.e., greater than 95 wt-% of sugars), glycerol, and water, and to provide a second raffinate stream comprising water, d-galactose, and salts. The second extract stream is passed to a third evaporization zone to provide a d-tagatose syrup having a Brix value of 60-65 and the d-tagatose syrup is passed to a tagatose crystallizer to provide a pure tagatose crystal product and a mother liquor comprising d-tagatose and glycerol. The mother liquor is passed to conventional glycerol removal zone, containing an adsorbent such as activated carbon, to adsorb glycerol to provide a glycerol free tagatose recycle stream. By glycerol free it is meant that the glycerol free tagatose recycle comprises less than 0.5 wt-% glycerol, on a water-free basis. At least a portion of the glycerol free tagatose recycle stream is passed to be admixed with the isomerized reactor mixture. At least a portion of the second raffinate is returned to a first concentration zone to provide a concentrated second raffinate stream. The concentrated second raffinate stream is admixed with the feed stream prior to passing the feed stream to the first SMB zone.

DETAILED DESCRIPTION OF THE DRAWINGS

Figure 1:
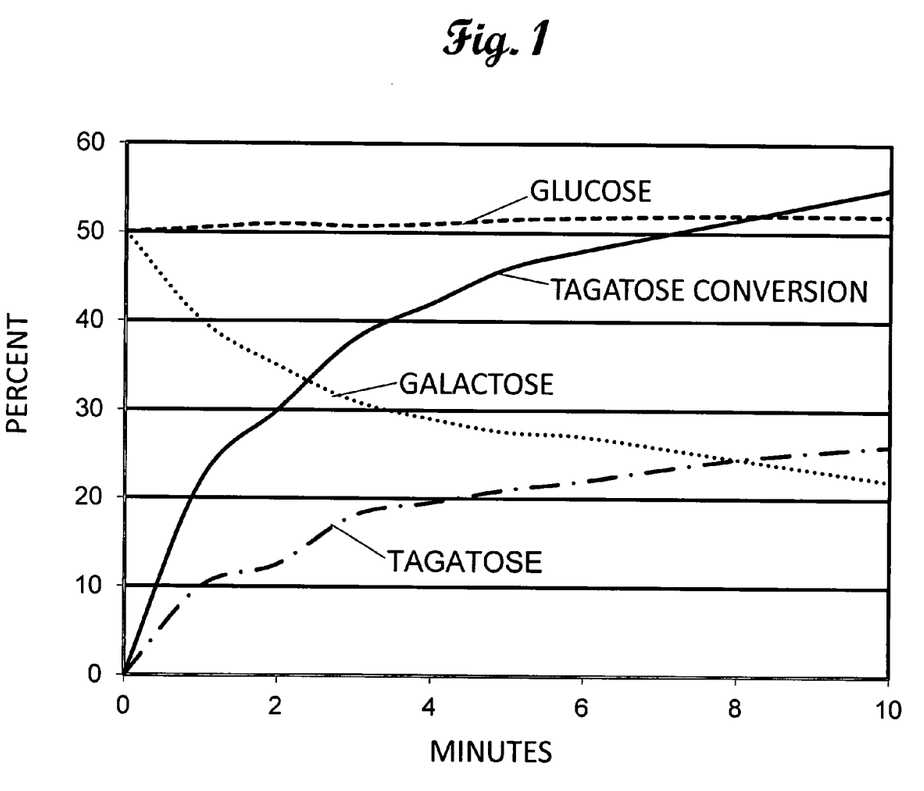
FIG. 1 is a chart showing the concentrations of d-galactose and d-tagatose in a galactose isomerization reaction step as a function of reaction time in the presence of calcium oxide and calcium chloride according to the present invention.

FIG. 1 shows the concentrations of d-galactose and d-tagatose in a galactose isomerization reaction step as a function of reaction time in the presence of calcium oxide and calcium chloride according to the present invention. As shown in FIG. 1, the d-tagatose conversion in the presence of glucose reaches a conversion level of between about 35 and about 45 weight percent in a reaction time of between about 3 and about 5 minutes. Over this reaction time of 3 to 5 minutes, the concentration of d-tagatose reaches a concentration of from about 16 to about 21 weight percent. The glucose concentration remains essentially constant at a level of 50 percent throughout the isomerization reaction.

Figure 2:
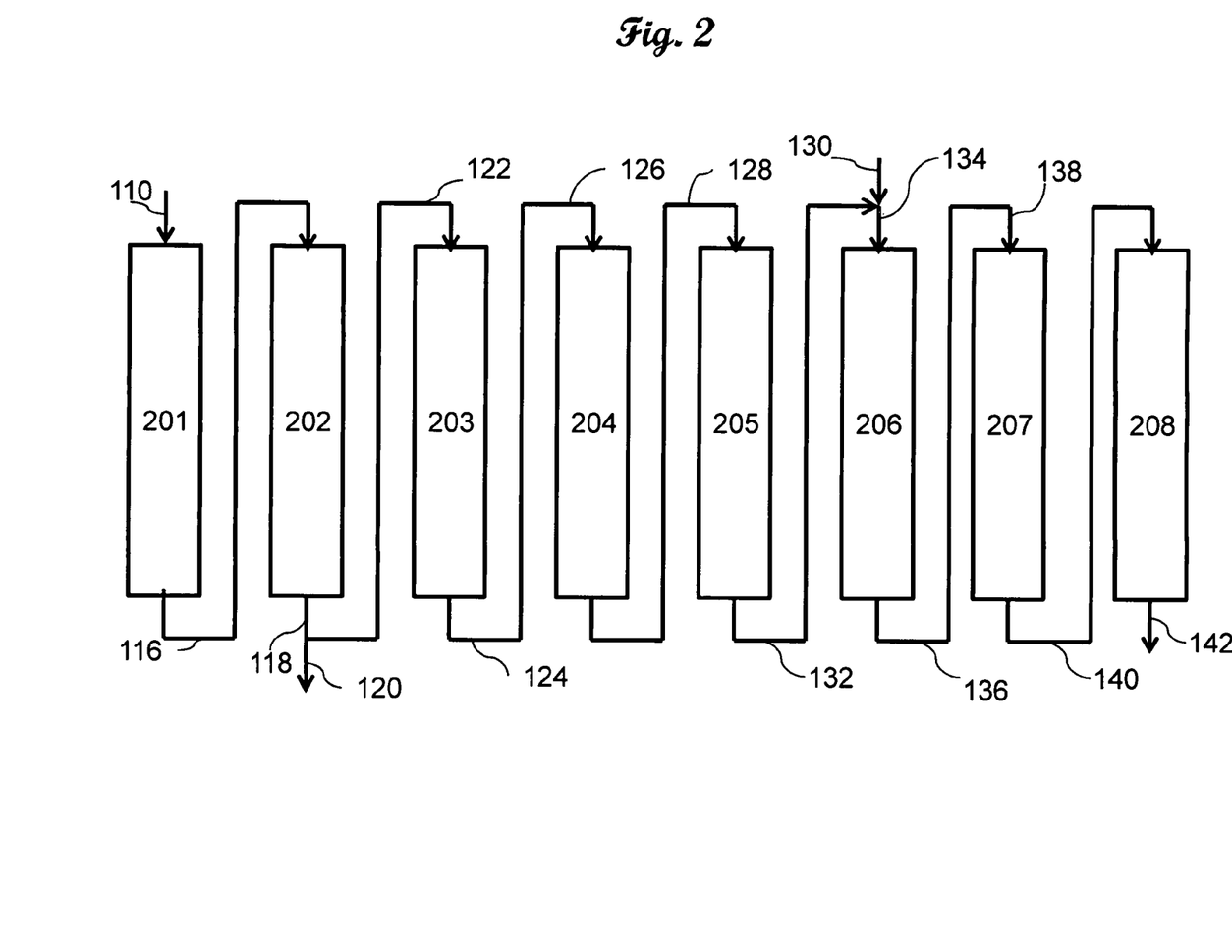
FIG. 2 is a schematic process flow diagram representing one embodiment of the present invention for a basic simulated moving bed adsorption process employing eight adsorption beds.

FIG. 2 shows one embodiment of the simulated moving bed SMB adsorption zone of the present invention based on an eight adsorbent bed arrangement. Adsorbent beds 201, 202, 203, 204, 205, 206, 207, and 208, containing a stationary phase adsorbent comprising a strong acid cation calcium exchange resin such as DOWEX 99CA/320 (Available from The Dow Chemical Company, Midland, Mich.), or other such resins as Rohm and Haas 1310 and 1320 resins, PUROLITE PCR resins (Available from Purolite, Bala Cynwyd, Pa.), and other DOWEX monosphere chromatographic resins, are disposed in a serial configuration such that in accordance with a prearranged cycle, conduit 116 provides fluid communication between the bottom of adsorbent bed 201 with the top of adsorbent bed 202, conduits 118 and 122 provide fluid communication between the bottom of adsorbent bed 202 bed and the top of adsorbent bed 203, conduit 126 provides fluid communication between the bottom of adsorbent bed 203 with the top of adsorbent bed 204, conduit 128 provides fluid communication between the bottom of adsorbent bed 204 with the top of adsorbent bed 205, conduits 132 and 134 provide fluid communication between the bottom of adsorbent bed 205 with the top of adsorbent bed 206, conduit 136 provides fluid communication between the bottom of adsorbent bed 206 with the top of adsorbent bed 207, conduit 140 provides fluid communication between the bottom of adsorbent bed 208 with the top of adsorbent bed 208, and conduit 142 provides for the withdrawal of fluid from the bottom of adsorbent bed 208. According to the prearranged SMB cycle of the present invention, an SMB zone feed stream is passed to the SMB adsorption zone in line 130 and 134 to adsorbent bed 206. A raffinate stream is withdrawn from adsorbent bed 208 in conduit 142, and an extract stream is withdrawn via conduits 118 and 120 from adsorbent bed 202. A desorbent stream of water is introduced to adsorbent bed 201 in conduit 110. In this embodiment, the adsorbent beds 201-208 are indexed according to a 2-3-3 SMB cycle such that at least 2 adsorbent beds (201 and 202) undergo desorption, at least 3 adsorbent beds (203, 204, and 205) undergo rectification, and at least 3 adsorbent beds (206, 207, and 208) undergo adsorption during the SMB cycle of the present invention.

Figure 3:
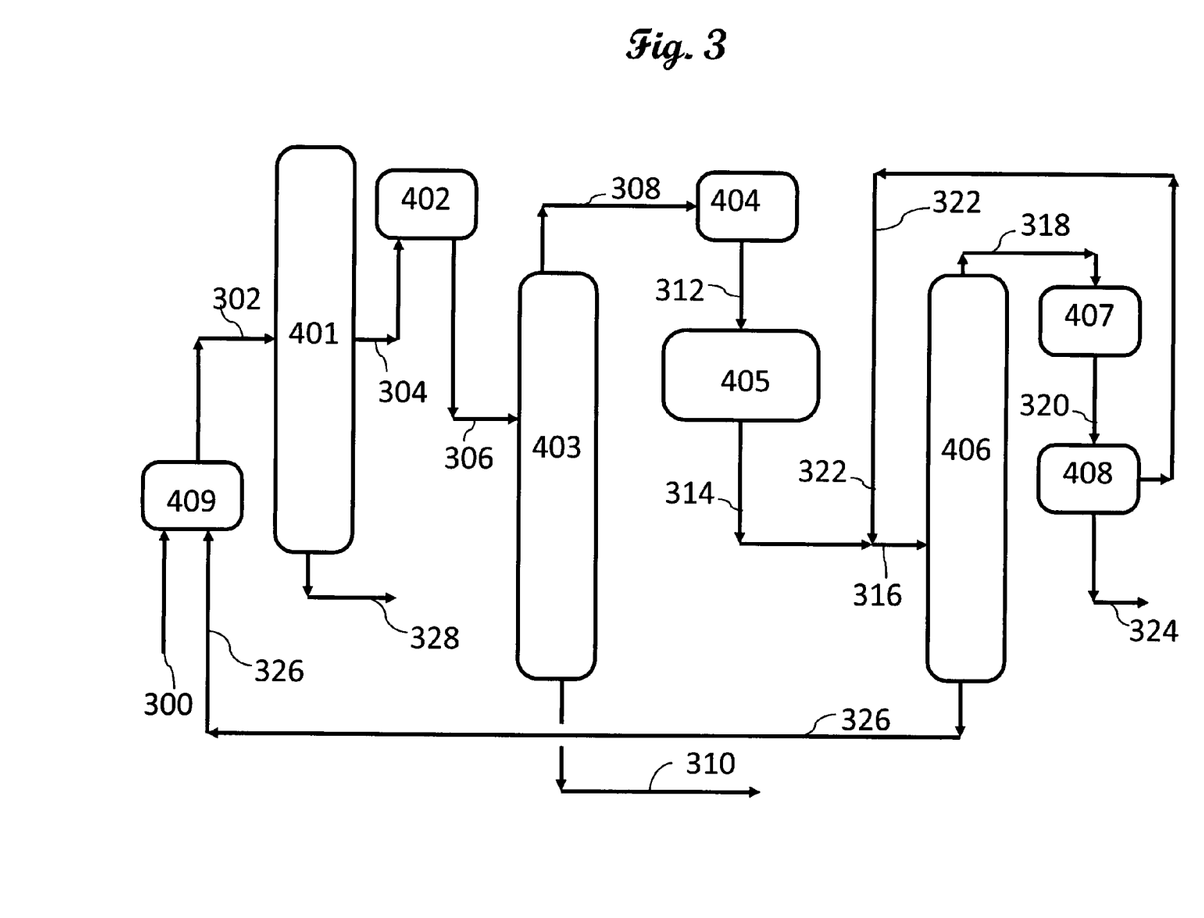
FIG. 3 is a schematic flow diagram one embodiment of the invention illustrating the operation of a d-tagatose production scheme employing 3 separate SMB zones.

According to an embodiment of the invention and with reference to FIG. 3, a feed stream comprising lactose hydrolysate and water in line 300 is passed to a first concentration zone 409 to provide a concentrated feed stream in line 302 having a Brix value of from about 25 to 35. The concentrated feed stream in line 302 is passed to an ion exclusion simulation SMB zone 401 to remove dissolved salts, disaccharides and lactose from momosaccharide sugars to provide an ion exclusion raffinate stream in line 328 comprising water, lactose, and salts, such as calcium chloride, and to provide a first extract stream in line 304 comprising water, d-galactose and d-glucose. The ion exclusion extract stream or first extract stream in line 304 is passed to a second concentration zone 404 to provide a concentrated first extract stream in line 306 having a Brix value of from about 25-35 and subsequently passing the concentrated first extract stream to a second SMB zone 403 to provide a second extract stream in line 308. The second extract stream has a Brix value of from about 5 to 7 and comprises about 20 wt-% glucose (based on sugar) and about 80 wt-% d-galactose (based on sugar). The second extract stream is passed to a third concentration zone 404 to provide a concentrated second extract stream or isomerization zone feed stream having a Brix value of from about 15 to about 20 in line 312 comprising water, d-galactose and d-glucose. The second SMB zone 403 also provides a second raffinate stream or d-glucose product stream in line 310 comprising substantially pure glucose (i.e., greater than about 95 wt-% of sugars), water, and a minor portion of d-galactose. The minor portion of d-galactose in the second raffinate stream corresponds to a concentration of the minor portion of d-galactose in the second raffinate stream is less than or equal to 10 wt-% of the sugars in the second raffinate stream. Preferably, the concentration of d-galactose in the second raffinate stream is less than or equal to 5 wt-% percent of the sugars in the second raffinate stream. The second extract stream or isomerization feed stream in line 312 having a Brix value of from about 15 to about 20 is passed to an isomerization reaction zone 405. In the isomerization reaction zone 405, the isomerization reaction is carried out in the presence of calcium oxide or calcium hydroxide and calcium chloride. The isomerization reaction is selective for the conversion of d-galactose to d-tagatose. This selective isomerization reaction is stopped at the desired level of conversion prior to the point where the products of the isomerization reaction would begin to degrade or form less valuable byproducts. The control of the degree of the isomerization reaction is achieved with the addition to the reaction mixture (not shown in FIG. 3) of an effective amount of dilute hydrochloric acid solution (30-37% HCl by weight). The amount of dilute hydrochloric acid added to the reaction mixture is an amount sufficient to neutralize the reaction mixture; that is, an amount of hydrochloric acid solution to adjust the pH of the reaction mixture to a pH of between about 6 and about 7. Upon the addition of the dilute hydrochloric acid solution, the available calcium oxide or calcium hydroxide is converted to calcium chloride and the isomerization reaction is halted. The neutralized isomerization reaction has a Brix value of from about 10 to about 15 and comprises about 50 wt-% of sugar as d-tagatose, about 20 wt-% of sugar as d-galactose, about 20 wt-% sugar as d-glucose, 10 wt-% of sugar as salts, and water. The neutralized isomerization reaction mixture comprising water, d-tagatose. d-galactose, d-glucose, salts, and water in line 314 is passed via lines 314 and 316 to a third SMB zone 406 to provide a d-tagatose extract stream in line 318 comprising substantially pure d-tagatose, a minor portion of d-galactose, and water, and to provide a third raffinate stream in line 326 comprising water, d-galactose, d-glucose, and salts. The d-tagatose extract stream has a Brix value of from about 5 to about 7 and is passed to fourth concentration zone 407 to provide a concentrated d-tagatose extract stream in line 320 having a Brix value of from about 60 to about 70. The concentrated d-tagatose extract stream as a sugar syrup is passed to a d-tagatose crystallizer 408 to provide a d-tagatose crystal product stream in line 324 having a purity of about 99 wt-% of sugar and mother liquor stream in line 322. The mother liquor stream in line 322 is recycled to be admixed with the neutralized isomerization reaction mixture in line 314 prior to passing the neutralized isomerization reaction mixture to the third SMB zone 406 via line 316. The third raffinate stream in line 326 is passed to the first concentration zone 409 to be combined with the feed stream in line 300 wherein it is blended with the lactose hydrolysate stream in line 300 prior to introducing the concentrated feed stream comprising lactose hydrolysate stream in line 302 to the ion exclusion SMB 401.

Each SMB zone may be operated individually or in parallel using a single rotary valve and associated control system. Alternatively, a number of separate SMB zones may be arranged in concentric zones such they can be operated by a single rotary valve. In such an arrangement, the number of columns or adsorbent beds is from 1 to 30, and divided into 3 circuits of 10 columns each. Each circuit is arranged in a 2-3-2-2 configuration, such that the columns or adsorbent beds at position 10, 20 and 30 are stationary at all times. A column may comprise one or several beds containing chromatographic media. Those feed tanks; filters, piping connecting flow between columns and/or beds where so connected, pumps, valving, pressure regulators, metering equipment, flow control and microprocessor equipment utilized in one embodiment are well known in construction and function to those of ordinary skill in the art.

The stationary phase adsorbent may be a cation ion exchange resin, such as a DOWEX 99CA/320 (Available from The Dow Chemical Company, Midland, Mich.), which is a strong acid cation calcium exchange resin. Other non-limiting examples of stationary phase resins include Rohm and Haas 1310 and 1320 resins, PUROLITE PCR resins and other DOWEX monosphere stationary phase resins.

Water is used as the mobile phase eluent for the SMB zones. Other eluents that perform functions the same as or similar to water known to those of ordinary skill in the art are also contemplated herein.

Depending on the original quality of the high purity d-tagatose material, the extract stream from the third SMB zone may require further purification, clean-up or polishing, usually to remove residual color. Addition of final polishing represents separate embodiments of our invention. If desired, it is recommended that the optional polishing step include one or more of the following known color removal methods: ion exchange, absorption, chemical treatment, carbon treatment or membrane treatment. Chemical treatment can include the addition of oxidizing agents, such as hydrogen peroxide wherein 0.1% to 0.15% on weight or equivalent conventionally recommended dosage. An example of membrane treatment is the employment of nano-filtration membranes which can remove small remaining colored compounds.

Evaporation of, or water removal from glucose product stream or raffinate from the second SMB zone, will be unnecessary when low amounts of dissolved solids are present and it is desired to, e.g., send to water treatment or water disposal facilities. Optionally, one of ordinary skill in the art may desire, e.g., to evaporate such streams for commercial reasons to concentrate remaining solids.

Figure 4:
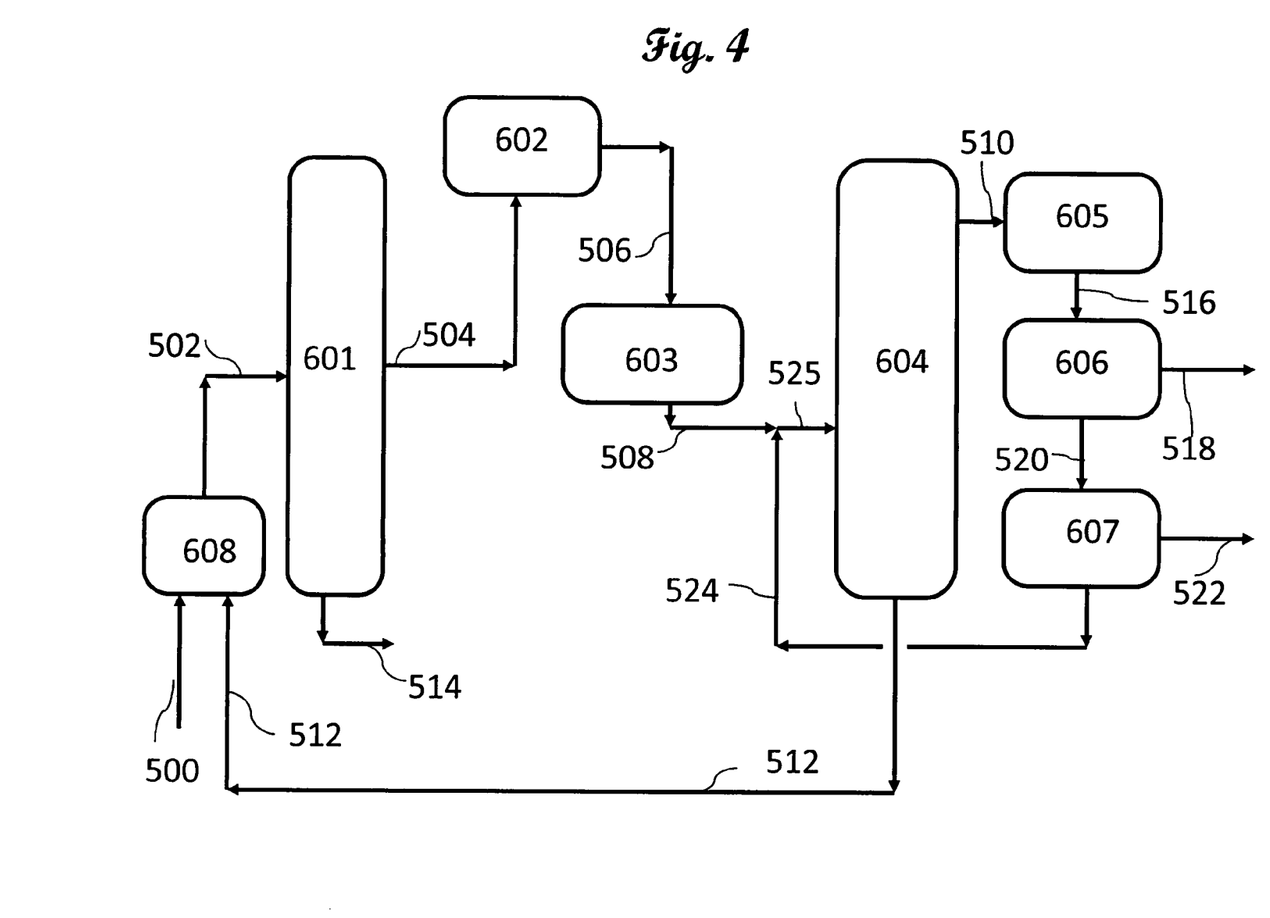
FIG. 4 is a schematic flow diagram one embodiment of the invention illustrating the operation of a d-tagatose production scheme employing 3 separate SMB zones and a d-tagatose crystallizer.

According to another embodiment of the invention and with reference to FIG. 4, a feed stream comprising lactose hydrolysate and water in line 500 is passed to a first concentration zone 608 to provide a concentrated feed stream in line 502 having a Brix value of from about 25 to 35. The concentrated feed stream in line 502 is passed to an ion exclusion SMB zone 601 to remove dissolved salts and lactose to provide an ion exclusion raffinate stream 514 comprising water, lactose, and salts, such as calcium chloride, and to provide a first extract stream in line 504 comprising water, galactose and glucose. The ion exclusion extract stream or first extract stream in line 504 is passed to a second evaporization zone 602 to provide an evaporated first extract stream in line 506 having a Brix value of from about 15 to about 20 and subsequently passing the evaporated first extract stream in line 506 to an isomerization reaction zone 603. In the isomerization reaction zone 603, the isomerization reaction is carried out in the presence of calcium oxide or calcium hydroxide. The isomerization reaction is selective for the conversion of d-galactose to d-tagatose. This selective isomerization reaction is stopped at the desired level of conversion prior to the point where the products of the isomerization reaction would begin to breakdown or form byproducts. The control of the degree of the isomerization reaction is achieved with the addition to the reaction mixture (not shown in FIG. 3) of an effective amount of dilute hydrochloric acid solution (30-37% HCl by weight). The amount of dilute hydrochloric acid added to the reaction mixture is an amount sufficient to neutralize the reaction mixture; that is, an amount of hydrochloric acid solution to adjust the pH of the reaction mixture to a pH of between about 6 and about 7. Upon the addition of the dilute hydrochloric acid solution, the available calcium oxide or calcium hydroxide is converted to calcium chloride and the isomerization reaction is halted. The neutralized isomerization reaction mixture has a Brix value of from about 10 to about 15 and the sugar portion comprises about 54 wt-% d-tagatose, about 36 wt-% galactose, about 10 wt-% other sugars, in addition to salts and water. The neutralized isomerization reaction mixture in line 508 is passed via lines 508 and 525 to a second SMB zone 604 to provide a d-tagatose extract stream in line 510 comprising water, d-tagatose and a minor portion of glycerol, and to provide a second raffinate stream in line 512 comprising water, d-galactose, and salts. The d-tagatose extract stream has a Brix value of from about 5 to about 7 and is passed to third evaporization zone 605 to provide an evaporated d-tagatose extract stream in line 516 having a Brix value of from about 60 to about 65. The evaporated d-tagatose extract stream as a sugar syrup is passed to a tagatose crystallizer 606 to provide a d-tagatose crystal product stream in line 518 having a purity of about 99 wt-% of sugar, and mother liquor stream comprising water, d-tagatose, and glycerol in line 520. The mother liquor stream in line 520 is passed to an glycerol removal zone 607 comprising activated carbon or other suitable adsorbent selective for removing glycerol, to adsorb glycerol on the selective adsorbent and to provide a tagatose recycle stream in line 524 which is admixed with the neutralized isomerization reaction mixture in line 508, prior to passing the neutralized isomerization reaction mixture to the second SMB zone 604 via line 525. During regeneration of the glycerol removal zone 607, the selective adsorbent is washed or regenerated to remove and/or recover the glycerol. The second raffinate stream in line 512 is passed to the first concentration zone 608 to be combined with the feed stream in line 500 wherein it is blended with the lactose hydrolysate stream in line 500, prior to introducing the evaporated feed stream comprising lactose hydrolysate stream in line 502 to the ion exclusion SMB 601.

Figure 5:
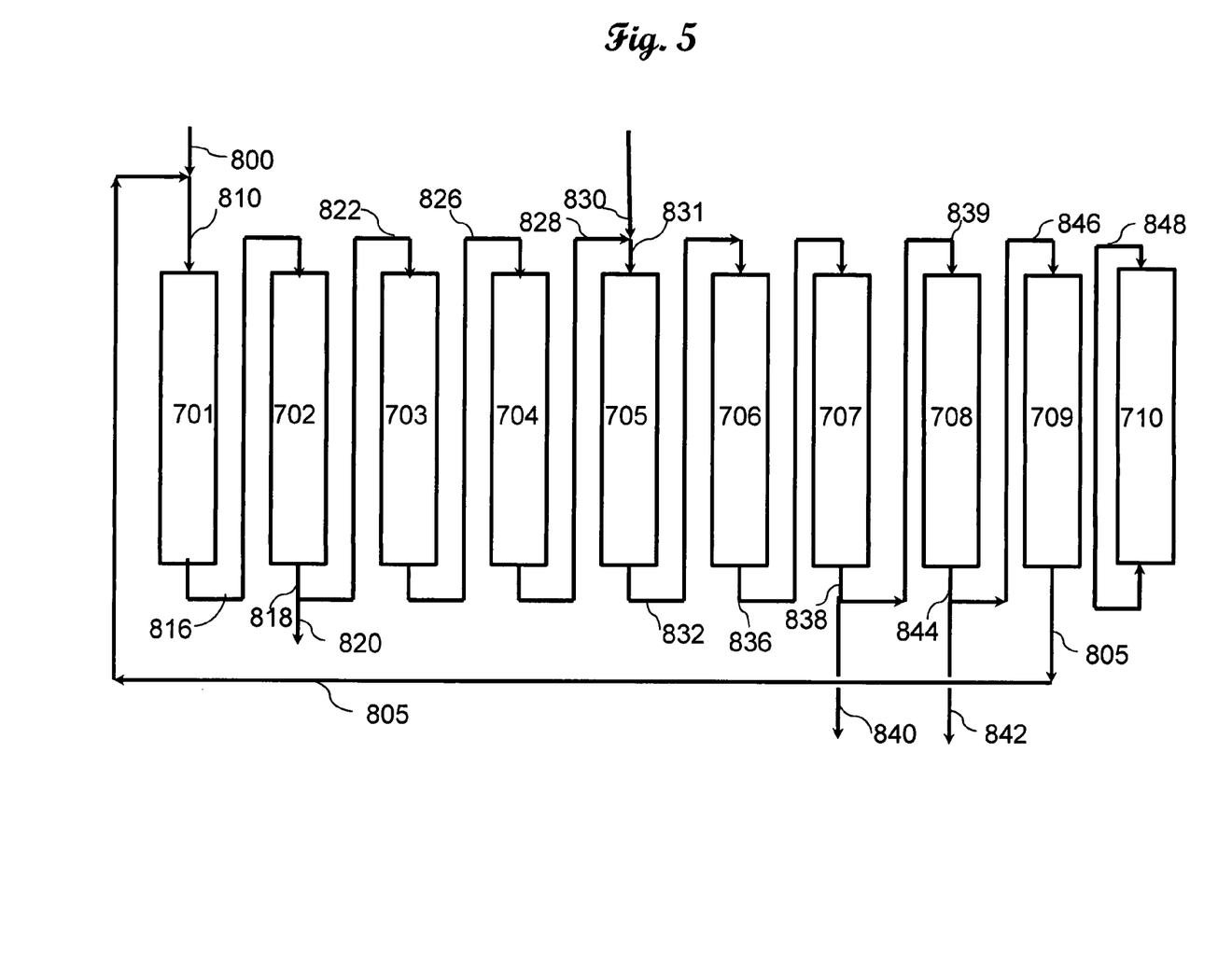
FIG. 5 is a schematic flow diagram one embodiment of the invention illustrating a 10-bed SMB circuit.

FIG. 5 shows a further embodiment of the simulated moving bed SMB adsorption zone of the present invention based on a 10 adsorbent bed arrangement. Adsorbent beds 701, 702, 703, 704, 705, 706, 707, 708, 709 and 710, containing a stationary phase adsorbent comprising a strong acid cation calcium exchange resin such as DOWEX 99CA/320 (Available from The Dow Chemical Company, Midland, Mich.), or other such resins as Rohm and Haas 1310 and 1320 resins, PUROLITE PCR resins (Available from Purolite, Bala Cynwyd, Pa.), and other DOWEX monosphere chromatographic resins, are disposed in a serial configuration such that in accordance with a prearranged cycle, conduit 816 provides fluid communication between the bottom of adsorbent bed 701 with the top of adsorbent bed 702, conduits 818 and 822 provide fluid communication between the bottom of adsorbent bed 702 bed and the top of adsorbent bed 703, conduit 826 provides fluid communication between the bottom of adsorbent bed 703 with the top of adsorbent bed 704, conduit 828 provides fluid communication between the bottom of adsorbent bed 704 with the top of adsorbent bed 705, conduit 832 provides fluid communication between the bottom of adsorbent bed 705 with the top of adsorbent bed 706, conduit 836 provides fluid communication between the bottom of adsorbent bed 706 with the top of adsorbent bed 707, conduits 838 and 839 provide fluid communication between the bottom of adsorbent bed 708 with the top of adsorbent bed 708, and conduits 844 and 842 provides for the withdrawal of raffinate fluid from the bottom of adsorbent bed 708. Conduits 838 and 840 provide a raffinate bleed out stream from adsorbent bed 707 to ensure that the column segments are clean before they are moved and that the solvent can be recycled directly back through the system. Conduits 844 and 846 provide fluid communication between the bottom of adsorbent bed 708 and the top of adsorbent bed 709. Conduit 805 provides fluid communication for a desorbent recycle between the bottom of adsorbent bed 709 and the top of adsorbent bed 701, via lines 810. Conduit 848 provides a pump around line between the bottom of stationary adsorbent bed 710 and the bottom of stationary adsorbent bed 710. According to the prearranged SMB cycle of the present invention, an SMB zone feed stream is passed to the SMB adsorption zone in line 830 and 831 to adsorbent bed 705. A raffinate stream is withdrawn from adsorbent bed 707 in conduits 838 and 840, and an extract stream is withdrawn via conduits 818 and 820 from adsorbent bed 702. A desorbent stream of water is introduced to adsorbent bed 701 in conduits 800 and 810. In this embodiment, the adsorbent beds 701-710 are indexed according to a 2-3-3-1 SMB cycle such that at least 2 adsorbent beds (701 and 702) undergo desorption, at least 3 adsorbent beds (703, 704, and 705) undergo rectification, and at least 3 adsorbent beds (706, 707, and 708) undergo adsorption during the SMB cycle of the present invention.

Further purification methods may include filtration, evaporation, distillation, drying, gas absorption, solvent extraction, press extraction, adsorption, crystallization, and centrifugation. Other purification methods may include further chromatography according to this invention utilizing batch, simulated moving bed (including continuous, semi-continuous, or sequential), such simulated moving bed utilizing more than one loop, utilizing more than one profile, less than one profile, or combinations of any of the forgoing as will be appreciated for application with this invention by those of ordinary skill in the art after reading this disclosure. In addition, further purification can include combinations of any of the forgoing, such as for example, combinations of different methods of chromatography, combinations of chromatography with filtration, or combinations of membrane treatment with drying.

The following examples are provided to illustrate the present invention. These examples are shown for illustrative purposes, and any invention embodied therein should not be limited thereto.

EXAMPLES

All purities or recovery values are generally expressed in terms of the total sugar content of the product or stream. In general, a high purity stream will comprise from 90 to 99 wt-% of the key component based on the total sugar in the product or stream. Similarly, recoveries are expressed in terms of recovery based on the total sugar content.

Example 1

Pulse Test of d-Glucose-d-Galactose Separation

A chromatographic column of 316 stainless steel and having an inside diameter of 22 mm and a length of 300 mm was prepared for high pressure liquid chromatography (HPLC) for use in establishing the elution profile of the major components of a d-glucose and d-galactose mixture. The chromatographic column was filled with 72 g of DOWEX 99CA/320 (Available from The Dow Chemical Company, Midland, Mich.), a strong acid cation calcium exchange resin stationary phase. The resin particles were in the form of beads and were 320 microns in size. A flow of mobile phase desorbent as deionized water at a rate of 0.5 ml/min was established in the column at a temperature of 65° C. A feed mixture of 50/50 wt-% d-glucose and d-galactose in deionized water was prepared by dissolving 0.5 g of d-galactose (>99% purity) and 0.5 g of alpha-d-glucose (>95% purity) in 20 mL of deionized water. 2 ml of a 5-wt % sugar solution of the 50/50 wt-% d-glucose-d-galactose in deionized water was injected into the column and the resulting eluent fractions were collected at 2 minute intervals. The eluent from the chromatographic column was monitored by refractive index using a Waters 410 RI detector (Available from Waters Corporation, Milford Mass.). The compositions were analyzed by HPLC. The results of Experiment 1 indicate a relative selectivity of 1.25 of glucose over the galactose. The relative selectivity was determined by considering the retention times or volumes of each of the components and the void volume of the column. In the above d-glucose-d-galactose separation, the retention time of the d-glucose elution was 13 minutes. The retention time of the d-galactose elution was 14 minutes. The column void time was determined by injecting a non-adsorbing solution of calcium chloride and detecting its elution time. The selectivity was determined as follows:

$$\text{Selectivity} = (14-9)/(13-9) = 1.25$$

Therefore, it was determined that a d-galactose-d-glucose separation in a simulated moving bed SMB process was feasible because the selectivity of the d-galactose-d-glucose separation over the acid resin stationary phase was greater than 1.2.

Example 2

Pulse Test of d-Galactose-d-Tagatose Separation

A chromatographic column of 316 stainless steel and having an inside diameter of 22 mm and a length of 300 mm was prepared for high pressure liquid chromatography (HPLC) for use in establishing the elution profile of the major components of a d-galactose-d-tagatose mixture. The chromatographic column was filled with 72 g of DOWEX 99CA/320 (Available from The Dow Chemical Company, Midland, Mich.), a strong acid cation calcium exchange resin stationary phase. The resin particles were in the form of beads and were 320 microns in size. A flow of mobile phase desorbent as deionized water at a rate of 0.5 ml/min was established in the column at a temperature of 65° C. A feed mixture of 50/50 wt d-galactose/d-tagatose in deionized water was prepared by dissolving 0.5 g of d-galactose (>99% purity) and 0.5 g of d-tagatose (Food grade, Available from Nutrilabs, Belgium) in 20 mL of deionized water. 2 ml of a 5-wt % solution of the 50/50 wt d-galactose/d-tagatose in deionized water was injected into the column and the resulting eluent fractions were collected at 2 minute intervals. The eluent from the chromatographic column was monitored by refractive index using a Waters 410 RI detector (Available from Waters Corporation, Milford Mass.). The compositions were analyzed by HPLC. The results of Experiment 2 indicate a relative selectivity of 2.57 of galactose over tagatose. Therefore, it was determined that a galactose-tagatose separation over the acid resin stationary phase in a simulated moving bed SMB process was feasible.

Example 3

D-Galactose Isomerization in a CSTR

An isomerization of d-galactose to d-tagatose was carried out in a stirred reactor on a simulated lactose hydrolysate consisting of 5 g of glucose and 5 g of d-galactose dissolved in 90 g of deionized water (Equivalent to a 10 Brix sugar solution) in a 500 mL flask and adjusting the temperature of the syrup to at 16° C. A calcium oxide/calcium chloride mixture of 3.11 g of CaO (98% reagent grade) powder and 0.11 g of $CaCl_2$ (anhydrous, 93%) was separately prepared by mixing the calcium oxide/calcium chloride mixture in 50 mL of deionized water to provide a homogeneous, milky slurry of calcium oxide/calcium chloride, and adjusting the temperature of the slurry to 16° C. The calcium oxide/calcium chloride slurry was slowly added to the syrup to form a reaction mixture under continuously stirring and while maintaining a reaction temperature of 16° C. and a pH of about 12.5. The pH was increased to 13.0 by drop wise addition of 10% NaOH solution. 1 mL samples were withdrawn from the reaction mixture every minute and neutralized with a dilute solution of HCl (30-37% by weight) to a pH of about 6.5 to about 7.0. The samples were analyzed by HPLC. At a reactor residence time of 270 minutes, the percent conversion of d-galactose was 74 wt-% of sugar, the yield of d-tagatose was 93.5 wt-% of sugar, and the losses of sugar to byproducts was 4.8 wt-% of sugar.

Example 4

D-Galactose Isomerization with Calcium Hydroxide

The procedure of Example 3 was repeated with an equal molar amount of calcium hydroxide to that of the total sugars in solution substituted for the calcium oxide. At the end of the reaction, the d-galactose conversion was 64 wt-% of sugar, and the yield of d-tagatose was 90 wt-% of sugar. The losses to sugar byproducts were about 5 wt-% of sugar.

Example 5

D-Galactose Isomerization without pH Adjustment

The procedures of Examples 3 and 4 were repeated without the step of raising the pH to 13.0 by the drop wise addition of the 10% sodium hydroxide solution. The d-galactose conversion to d-tagatose was found to be 5-8 wt % of sugar less than the conversion measured in Example 3 based on using calcium oxide and less than the conversion measured in Example 4 based calcium hydroxide.

Example 6

D-Galactose Isomerization with SMB Extract in CSTR

An isomerization of d-galactose to d-tagatose was carried out in a stirred reactor (CSTR) on a simulated SMB extract composition (20/80 wt % of sugar d-Glucose-d-Galactose, 20 Brix, See FIG. 3, line 306). 4 g of d-glucose and 16 g of d-galactose dissolved in 80 g of deionized water (Equivalent to a 20 Brix sugar solution) in a 500 mL flask and adjusting the temperature of the syrup to at 12° C. A calcium oxide/calcium chloride mixture of 2.50 g of CaO (98% reagent grade) powder and 0.65 g of $CaCl_2$ (anhydrous, 93%) was separately prepared by mixing the calcium oxide/calcium chloride mixture in 50 mL of deionized water to provide a homogeneous, milky slurry of calcium oxide/calcium chloride, and adjusting the temperature of the slurry to 12° C. The calcium oxide/calcium chloride slurry was slowly added to the syrup to form a reaction mixture under continuously stirring and while maintaining a reaction temperature of 12° C. and a pH of about 12.5. The pH is increased to 13.0 by drop wise addition of 10% NaOH solution. 1 mL samples were withdrawn from the reaction mixture every minute and neutralized with a dilute solution of HCl (30-37% by weight) to a pH of about 6.5 to about 7.0. The samples were analyzed by HPLC. At a reactor residence time of 240 minutes, the percent conversion of d-galactose was 72.2 wt-% of sugar, the yield of d-tagatose was 77.1 wt-% of sugar, and the losses of sugar to byproducts was 5.7 wt-% of sugar.

Example 7

D-Galactose Isomerization with SMB Extract and $Ca(OH)_2$

Example 6 was repeated using Ca(OH)2 in place of CaO, with 50 mol % $Ca(OH)_2$ to that of d-galactose in solution. The d-galactose conversion at the end of the reaction is found to be 60 wt %, yield of d-tagatose was 95 wt % of sugar and losses were 4.5 wt % of sugar.

Example 8

D-Galactose Isomerization with SMB Extract and No pH Adjustment

The procedures of Examples 6 and 7 were repeated without the step of raising the pH to 13.0 by the drop wise addition of the 10% sodium hydroxide solution. When experiment was carried out using either $Ca(OH)_2$ or CaO, without adjusting pH to 13.0 using 10% NaOH, the d-galactose conversion was found to be 5-8 wt-% of sugar less than the conversion measured in Example 6 based on using calcium oxide and less than the conversion measured in Example 7 based calcium hydroxide.

Example 9

D-Galactose Isomerization with Ferment of Lactose Hydrolysate in a CSTR

An isomerization of d-galactose to d-tagatose was carried out in a stirred reactor (CSTR) on a simulated ferment of lactose hydrolysate with composition (90 wt % of sugar d-Galactose, 5 wt % of sugar glycerol, 5% of sugar as other sugars, 20 Brix, See FIG. 4). 20 g of d-galactose and 1 gm of glycerol dissolved in 79 g of deionized water (Equivalent to a 20 Brix sugar solution) in a 500 mL flask and adjusting the temperature of the syrup to at 20° C. A calcium oxide/calcium chloride mixture of 6.22 g of CaO (98% reagent grade) powder and 0.32 g of $CaCl_2$ (anhydrous, 93%) was separately prepared by mixing the calcium oxide/calcium chloride mixture in 50 mL of deionized water to provide a homogeneous, milky slurry of calcium oxide/calcium chloride, and adjusting the temperature of the slurry to 16° C. The calcium oxide/calcium chloride slurry was slowly added to the syrup to form a reaction mixture under continuously stirring and while maintaining a reaction temperature of 16° C. and a pH of about 12.5. The pH is increased to 13.0 by drop wise addition of 10% NaOH solution. 1 mL samples were withdrawn from the reaction mixture every minute and neutralized with a dilute solution of HCl (30-37% by weight) to a pH of about 6.5 to about 7.0. The samples were analyzed by HPLC. At a reactor residence time of 270 minutes, the percent conversion of d-galactose was 96 wt-% of sugar, the yield of d-tagatose was 81.4 wt-% of sugar, and the losses of sugar to byproducts were 18.0 wt-% of sugar.

Example 10

D-Galactose Isomerization with Ferment of Lactose Hydrolysate using $Ca(OH)_2$

Experiment 9 was repeated using $Ca(OH)_2$ in place of CaO, with equal molar amount of $Ca(OH)_2$ to that of d-galactose in solution. The d-galactose conversion at the end of the reaction using $Ca(OH)_2$ was found to be 80 wt % of sugar, yield of d-tagatose was 90 wt % of sugar and losses were 15.0 wt % of sugar.

Experiment 11

D-Galactose Isomerization with Ferment of Lactose Hydrolysate without pH Adjustment Experiments 9 and 10 were repeated without the step of drop wise adjusting the pH of the reaction mixture to 13.0. It was found that when using either $Ca(OH)_2$ or CaO and not adjusting pH to 13.0 with 10% NaOH, the resulting d-galactose conversion was 7-8 wt-% of sugar less in above Examples 9 and 10, respectively.

Experiment 12

D-Galactose Isomerization in a Plug Flow Reactor

An isomerization of d-galactose to d-tagatose was carried out in a plug flow reactor (PFR) on a simulated lactose Hydrolysate with composition (50% Galactose, 50% glucose, 10 Brix, scheme-1). 25 g of d-galactose and 25 g of glucose was dissolved in 450 g of deionized water (Equivalent to a 10 Brix sugar solution) in a 1000 mL flask and adjusting the temperature of the syrup to at 25° C. A calcium oxide/calcium chloride mixture of 15.55 g of CaO (98% reagent grade) powder and 3.20 g of $CaCl_2$ (anhydrous, 93%) was separately prepared by mixing the calcium oxide/calcium chloride mixture in 1000 mL of deionized water to provide a homogeneous, milky slurry of calcium oxide/calcium chloride, and adjusting the temperature of the slurry to 25° C. and the pH to 13.0 by drop wise addition of 10% NaOH solution. Two columns 300 mm in length and 22 mm inside diameter of polypropylene were filled with 2 mm soda lime glass beads and filters on each end. The effective void volume of column when filled was about 50% i.e. about 55 mL. Two pumps were arranged to pump slurry and sugar solution separately and their outlets are connected by a 'T' just before entering column 1. Flow rates were adjusted to provide 0-10 min residence time to the sugar and slurry solution to mix and react within the PFR before exiting the PFR. An outlet tube was connected to the end of column 1 and beginning of column 2. Another pump that pumped a 30-37% diluted solution of hydrochloric acid is connected to column 2, which acted as a neutralizer for the reaction mixture. Flow rate of pump 3 was adjusted so the effluent coming out was of pH 6.5-7. The samples were taken at each flow rate condition of pumps 1 and pump 2 to inject into the HPLC for analysis. At a residence time of 5 min, the d-galactose conversion was 56 wt % of sugar, yield of d-tagatose was 74.7 wt % of sugar, and other sugar losses were 7.7% of sugar. At higher residence time of 10 min, d-galactose was found to degrade drastically to 10-15% sugar losses (See FIG. 1).

Example 15

Plug Flow Reactor using Calcium Hydroxide

The procedure of Example 11 was repeated using calcium hydroxide in place of the calcium oxide with an equal molar amount of calcium hydroxide relative to that of the total sugar in solution. The d-galactose conversion at the end of the reaction was found to be 45 wt-% of sugar with a 70 wt-% yield of d-tagatose based on total sugar, and with losses to byproducts of 5.1 wt-% of sugar.

Example 14

Plug Flow Reactor without pH Adjustment

Examples 12 and 13 were repeated without the step of increasing the pH to 13.0. In both cases either with calcium oxide or with calcium hydroxide, the d-galactose conversion was found to be 7-8 wt-% of sugar lower than in both Example 13 and in Example 14.

Example 15

Ion Exclusion SMB Removal of Salt from Sugars

An SMB unit (Available from Orochem Technologies Inc., Lombard, Ill.) was configured with 30 columns divided equally into 3 circuits. Each circuit contained 10 columns arranged as shown in FIG. 5. The size of each column was 14 inch×65 inch (35.56 cm×165.1 cm) and each column had an empty volume of 150 liters. Each column was packed with 117 kg of Dowex 99CA/320 resin (Available from the Dow Chemical Company, Midland, Mich.), a strong acid cation calcium exchange resin stationary phase. The 30 columns were mounted on a rotating carousal. Fluid distribution valve was located at the center of the unit. Flow rates in the circuits were controlled through control panel by adjusting valve displacement and pump rates. Each circuit was divided into 4 different zones i.e. (2-3-2-2) configuration. (Refer FIG. 5). At step 1, feed was pumped into column 705 and Raffinate was withdrawn (faster moving components/salts) from column 707. Desorbent is pumped to column 701 and extract (slower moving component/sugars) were withdrawn from column 702. Part of extract is pumped back into the column 703 and part of raffinate is pumped into column 708 and comes out as a Raffinate Bleed stream 840. A portion of the Raffinate bleed stream 840 was pumped back into column 709 to push residual desorbent out in line 805 and recycle the desorbent to column 701. Column 710 is stationary at given step in order to avoid back mixing of fluids within intermediate circuits. The desorbent used was deionized water having a pH of about 6.5 to about 7.

With reference to FIG. 3, the feed stream comprising lactose hydrolysate (45% d-glucose, 45% d-galactose, 10% unconverted lactose and salts) at 10-12 Brix was blended with raffinate stream coming out of SMB 406 and passed through evaporator 409 to prepare feed for SMB 401 (Ion-Exclusion SMB) at about 25-35 Brix. The feed stream was pumped to the SMB 401 unit at a feed rate of 1 L/min, and the desorbent, RO water (reverse osmosis) at low conductivity, was pumped at a rate of 8.5 L/min. A first extract stream in line 304 was withdrawn at a rate of 7.0 L/min and a raffinate stream in line 328 was withdrawn at a rate of 2.5 L/min. The SMB unit 406 was maintained at an SMB ion exclusion operating temperature of about 65° C., and the step time for the rotary valve was 900 seconds (15 min). The SMB unit provided an extract stream comprising of only sugars with Brix value 10-12 Brix at a recovery about 98 to 99 wt-% based on sugar.

Example 16

SMB Scheme with Fermented Lactose Hydrolysate

In another process flow scheme (See FIG. 4.) using the SMB unit of Example 15, the feed obtained from fermentation of lactose hydrolysate comprising 90% d-galactose, 5% glycerol and 5% other sugars and salts at 25-35 Brix, was blended with raffinate stream coming out of SMB-604 and passed through a first evaporation zone 608 to increase the sugar concentration to 25-35 Brix. The admixed feed was pumped to the SMB unit 601 at a feed rate of 1 L/min, and the desorbent, RO water (reverse osmosis) at low conductivity was pumped at a rate of 8.5 L/min. A first extract stream was withdrawn in line 504 at a rate of 7.0 L/min and a raffinate stream was withdrawn in line 514 at a rate of 2.5 L/min. The SMB unit 601 was maintained at an ion exclusion SMB operating temperature of about 65° C., and the step time was 900 seconds (15 min). The ion exclusion SMB unit 601 provided an extract stream in line 504 comprising of only sugars with 10-12 Brix at a recovery about 98 to 99 wt-% based on sugar.

Example 17

Simulated Moving Bed Technology—Glucose-Galactose SMB Separation

An SMB unit (available from Orochem Technologies Inc., Lombard, Ill.) was configured as a combination of 30 columns divided equally into 3 circuits. Each circuit contained 10 columns. The size of each column was 14 inches in diameter×65 inches in length (35.56 cm×165.1 cm) and had an empty volume of 150 liters. Each column was packed with 117 kg of Dowex 99CA/320 resin (Available from the Dow Chemical Company, Midland, Mich.), a strong acid cation calcium exchange resin stationary phase. The 30 columns were mounted on a rotating carousal. A fluid distribution valve was located at the center of the unit. Flow rates were controlled through control panel by adjusting valves and pump rates. Each circuit was divided into 4 different zones in a 2-3-2-2 configuration. (See FIG. 5) At step 1, feed was pumped into column 705 and Raffinate was withdrawn from (faster moving components/salts) column 707. Desorbent was pumped to column 701 and extract (slower moving component/sugars) was withdrawn from column 702. Part of extract is pumped back into the column 703 and part of raffinate is pumped into column 708 and was withdrawn as Raffinate Bleed. Raffinate bleed is pumped back into column 709 to push residual desorbent out and recycle. Column 710 is stationary at any given step in order to avoid back mixing of fluids within intermediate circuits. The desorbent was RO water (reverse osmosis) at low conductivity. A 45/45 wt-% based on sugar ratio of d-glucose to d-galactose syrup at 25-35 Brix obtained from evaporator 603, (See FIG. 4) was pumped into SMB 604 as feed at 0.5 L/min. The desorbent in line 800 (FIG. 5) is RO water (reverse osmosis) at low conductivity pumped at 8.5 L/min. An extract stream in lines 818 and 820 was withdrawn at a rate of 1.5 L/min and a raffinate stream in lines 838 and 840 was withdrawn at a rate of 7.4 L/min. Part of raffinate stream was pumped back into SMB as raffinate bleed in line 840 at 5.5 L/min and residual desorbent was passed to a desorbent tank (Not Shown). The SMB unit was maintained at a temperature of 65° C., and the step time was 780 seconds (13 min). The SMB unit provided an extract stream comprising d-galactose having a purity of about 80 wt-% of sugar, at a recovery about 95 wt-% based on sugar. The raffinate stream is 90-95 wt % of sugar as d-glucose syrup which was sent to evaporator to concentrate to provide a commercial glucose product.

Example 18

Simulated Moving Bed Technology—Galactose-Tagatose SMB Separation

An SMB unit (available from Orochem Technologies Inc., Lombard, Ill.) was configured as a combination of 30 columns divided equally into 3 circuits. Each circuit contained 10 columns. The size of each column was 14 inch×65 inch (35.56 cm×165.1 cm) and had an empty volume of about 150 liters. Each column was packed with 117 kg of Dowex 99CA/320 resin (Available from the Dow Chemical Company, Midland, Mich.), a strong acid cation calcium exchange resin stationary phase. The 30 columns were mounted on a rotating carousal. A fluid distribution valve was located at the center of the unit. Flow rates were controlled through control panel by adjusting valves and pump rates. Each circuit was divided into 4 different zones, i.e. (2-3-2-2) configuration. (See FIG. 5) At step 1, feed in lines 830 and 831 is pumped into column 705 and Raffinate is withdrawn (faster moving components/salts) from the bottom of column 707. Desorbent in lines 800 and 810 was pumped to the top of column 701 and extract (slower moving component/sugars) was withdrawn from the bottom of column 702. A portion of the extract in lines 818 and 822 was pumped back into the column 703 and a portion of the raffinate in lines 838 and 842 was pumped to the top of column 708 to provide a Raffinate Bleed in lines 844 and 842 from the bottom of column 708. The Raffinate bleed is pumped back into column 709 to push residual desorbent out and recycle desorbent in line 805. Column 710 was stationary at any given step in order to avoid back mixing of fluids within intermediate circuits. The desorbent was RO water (reverse osmosis) at low conductivity. According to FIG. 3, the Galactose isomerate had a Brix value of 10-15 and comprised 40-60% d-tagatose, 20% d-glucose, 10-20% d-galactose and $CaCl_2$ salts. The galactose isomerate was filtered to remove solid particulates and fed into SMB-406. The desorbent was RO water (reverse osmosis) at low conductivity. The desorbent had a pH 6.5-7.0 and was pumped at a rate of 8.5 L/min. The extract stream in line 318 was withdrawn at a rate of 2.0 L/min and the raffinate stream in line 326 was withdrawn at a rate of 8.0 L/min. A portion of the raffinate stream was pumped back into SMB as raffinate bleed at a rate of 4.5 L/min and residual desorbent was returned to the desorbent tank (Not Shown). The SMB unit was maintained at a temperature of 65° C., and the step time of the rotary valve was 1020 seconds (17 min). The SMB unit provided an extract stream comprising d-tagatose having a purity of about 95-98 wt-% of sugar at a recovery about 95 wt-% based on sugar. The raffinate stream comprised d-glucose, d-galactose and CaCl$_2$ salts at 5-7 Brix. The raffinate stream was passed to evaporator 409 to concentrate prior to passing the evaporated raffinate/feed admixture to the ion exclusion SMB-401 for salt removal.

Example 19

Simulated Moving Bed
Technology—Galactose-Tagatose SMB Separation

In another scheme (See FIG. 4), when the Galactose isomerate in line 508 has composition of 40-60% d-tagatose, 5% glycerol, 10% other sugars, 20-30% unconverted d-galactose & CaCl$_2$ salts at 10-15 Brix is fed into SMB 604. The desorbent is RO water (reverse osmosis) at low conductivity and pH 6.5-7.0 was pumped at 8.5 L/min. An extract stream in line 510 was withdrawn at a rate of 2.0 L/min and a raffinate stream was withdrawn in line 512 at a rate of 8.0 L/min. Part of raffinate stream was pumped back into the SMB as raffinate bleed at 4.5 L/min and residual desorbent was sent into desorbent tank. The SMB zone 604 was maintained at a temperature of 65° C., and the step time was 1020 seconds (17 min). The SMB zone 604 provided an extract stream in line 318 comprising d-tagatose having a purity of about 95-98 wt-% of sugar at a recovery about 95 wt-% on sugar. The raffinate stream in line 512 comprised glucose, galactose and CaCl$_2$ salts at 5-7 Brix and was returned to evaporator 608 to concentrate the stream prior to passing the evaporated raffinate stream to the ion exclusion SMB zone 601 for salt removal.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims, while the description, abstract and drawings are not to be used to limit the scope of the invention. The invention is specifically intended to be as broad as the claims below and their equivalents.

What is claimed is:

1. A process for the production of high purity d-tagatose and high purity d-glucose from a lactose hydrolysate stream, said process comprising:
    a. passing the lactose hydrolysate stream comprising d-galactose, d-glucose, lactose, disaccharides, water and salts to an ion exclusion SMB zone containing a plurality of ion exclusion beds containing an ion exclusion stationary phase agent selective for the adsorption of d-galactose and d-glucose and operated in an ion exclusion cycle to provide a first extract stream comprising d-galactose, d-glucose and water, and removing a first raffinate stream comprising lactose, disaccharides, water and salts;
    b. passing the first extract stream to a second SMB zone containing a plurality of galactose separation beds containing a galactose stationary phase agent selective for the adsorption of d-galactose and d-glucose and operated in a galactose adsorption cycle at effective galactose/glucose separation conditions to provide a second extract stream comprising d-galactose, d-glucose, and water, and a second raffinate stream or high purity glucose product stream comprising d-glucose, d-galactose, and water;
    c. passing the second extract stream to a galactose isomerization zone and therein contacting the second extract stream with calcium oxide and calcium chloride at effective isomerization conditions to isomerize at least a portion of the d-galactose to d-tagatose and to provide a galactose isomerate stream comprising d-tagatose, d-galactose, d-glucose, calcium hydroxide, calcium oxide and water;
    d. neutralizing the galactose isomerate stream with an effective amount of dilute hydrochloric acid to stop the isomerization and to convert at least a portion of the calcium oxide to calcium chloride and to provide a neutralized galactose isomerate stream comprising d-tagatose, d-galactose, d-glucose, calcium chloride and water;
    e. passing the neutralized galactose isomerate stream to a third SMB zone containing a plurality of tagatose separation beds containing a tagatose stationary phase agent selective for the adsorption of d-tagatose and operated in a tagatose adsorption cycle at effective tagatose separation conditions to provide a high purity d-tagatose product stream and a third raffinate stream comprising glucose, calcium chloride and water; and,
    f. returning at least a portion of the third raffinate stream to the ion exclusion SMB zone to be combined with the lactose hydrolysate stream of step a.

2. The process of claim 1, wherein the ion exclusion stationary phase agent is a strong acid calcium exchange cation resin.

3. The process of claim 1, wherein the galactose stationary phase agent is a strong acid cation calcium exchange resin.

4. The process of claim 1, wherein the tagatose stationary phase agent is a strong acid calcium exchange cation resin.

5. The process of claim 1, wherein the plurality of ion exclusion beds is 10 and the ion exclusion cycle comprises a 2-3-2-2 SMB cycle.

6. The process of claim 1, wherein the plurality of galactose separation beds is 10 and the galactose separation cycle comprises a 2-3-2-2 SMB cycle.

7. The process of claim 1, wherein the plurality of tagatose separation beds is 10 and the tagatose separation cycle comprises 2-3-2-2 SMB cycle.

8. The process of claim 1, wherein the effective galactose/glucose separation conditions include a temperature of from about 50 to about 65° C.

9. The process of claim 1, wherein the effective tagatose separation conditions include a temperature of from about 50 to about 65° C.

10. The process of claim 1, wherein the effective conditions to isomerize at least a portion of the d-galactose to d-tagatose include an isomerization temperature of between about 9° C. and about 20° C., and a pH greater than or equal to 12.

11. The process of claim 1, wherein the effective conditions to isomerize at least a portion of the d-galactose to d-tagatose include an isomerization temperature of between about 9° C. and about 16° C., and a pH from about 12.8 to 13.

12. The process of claim 1, wherein the calcium oxide is present in a molar ratio of d-galactose to calcium oxide of from 1.1:1 to 1:1.1.

13. A continuous SMB process for the production of d-tagatose, said process comprising:
   a. passing a lactose hydrolysate stream comprising water, d-galactose, d-glucose, lactose, disaccharides, and salts to an ion exclusion SMB zone containing a plurality of adsorbent beds comprising a strong acid cation calcium exchange resin adsorbent, to provide a first extract stream comprising water, d-galactose and glucose and to reject an ion exclusion raffinate stream or first raffinate stream comprising lactose, disaccharides, water and salts;
   b. passing the first extract stream to a second SMB zone containing a plurality of adsorbent beds comprising a strong acid cation calcium exchange resin adsorbent to provide a second extract stream comprising substantially pure d-galactose, water, and a minor portion of d-glucose, and to provide a second raffinate stream or glucose product stream comprising substantially pure d-glucose, water, and a minor portion of d-galactose ;
   c. passing the second extract stream to an isomerization zone to isomerize at least a portion of the d-galactose to d-tagatose in the presence of calcium oxide and calcium chloride at a pH of between about 12 and 13, an isomerization temperature of between about 9° C. and about 14° C., and in a d-galactose/calcium oxide molar ratio of from 1.1:1 to 1:1.1 to provide an isomerate stream comprising water, d-tagatose, d-galactose, glucose, calcium oxide and salts;
   d. neutralizing the isomerate stream to a pH of between about 6 and about 7 with a dilute hydrochloric acid stream to provide a neutralized isomerate stream comprising water, d-tagatose, d-galactose, glucose, calcium chloride and salts;
   e. passing the isomerate stream to a first concentration zone to remove at least a portion of the water to provide a first concentrated stream;
   f. passing the first concentrated stream to a third SMB zone containing a plurality of adsorbent beds comprising a strong acid cation calcium exchange resin adsorbent to provide a substantially pure d-tagatose product stream comprising d-tagatose, water, and a minor portion of d-galactose and a third raffinate stream comprising water, d-galactose, glucose, and salts;
   g. passing at least a portion of the third raffinate stream to a second concentration zone to provide a second concentrated stream; and,
   h. combining the second concentrated stream with the lactose hydrolysate stream prior to passing the lactose hydrolysate stream to the ion exclusion SMB zone.

14. The process of claim 1, wherein the minor portion of d-galactose in the glucose product stream is less than about 5 wt-%.

15. The process of claim 1, wherein the minor portion of d-galactose in the d-tagatose product stream is less than about 5 wt-%.

16. The process of claim 1, wherein the lactose hydrolysate stream is derived from biomass or whey.

17. The process of claim 1, wherein the isomerization zone comprises an isomerization reaction zone and a neutralization zone, wherein the second extract stream is contacted in the reaction zone with calcium oxide and calcium chloride for an effective residence time to provide a reactor effluent stream and the reactor effluent stream is contacted with a hydrochloric acid stream to provide a precipitate and the neutralized galactose isomerate stream.

18. The process of claim 17, wherein calcium oxide and the calcium chloride are initially present in the reactor zone in a ratio of from 4:1 to 6:1 w/w of calcium oxide to calcium chloride.

19. The process of claim 17, wherein the acid stream is about 6 to about 7 volume percent of the second extract stream.

20. The process of claim 1, wherein the ion exclusion cycle, the galactose separation cycle, and the tagatose separation cycle each comprise a 2-3-2-2 SMB cycle and an additional stationary separation bed.

21. A process for producing a pure d-tagatose crystal product from a feed stream of fermented lactose hydrolysate comprising lactose, d-galactose, glycerol, other sugars, and salts, said process comprising:
   a. passing the feed stream to an ion exclusion SMB zone comprising a plurality of adsorbent columns containing a strong acid cation stationary phase and operating in a 2-3-2-2 SMB cycle with water as a desorbent to provide a first extract stream comprising water, d-galactose and glycerol, and to reject a first raffinate stream comprising lactose, water, other sugars, and salts;
   b. passing the first extract stream to a second evaporation zone to provide an evaporated first extract stream having a Brix value of between about 15 and about 20 and passing the evaporated first extract stream to an isomerization zone containing calcium oxide or calcium hydroxide to provide an isomerized reactor mixture:
   c. neutralizing the isomerized reactor mixture to provide a neutralized isomerization reactor mixture and passing the neutralized isomerized reactor mixture to a second SMB zone comprising a plurality of adsorbent columns containing a strong acid cation calcium exchange resin stationary phase and operating in a 2-3-2-2 SMB cycle with water as a desorbent to provide a second extract stream comprising substantially pure d-tagatose, water, and glycerol and a second raffinate stream comprising substantially pure d-galactose, water, salts and a minor portion of d-tagatose;
   d. passing the second extract stream to a third evaporization zone to provide a d-tagatose syrup having a Brix value of 60-65 and passing the d-tagatose syrup to a tagatose crystallizer to provide a pure d-tagatose crystal product and a mother liquor comprising d-tagatose and glycerol;
   e. passing the mother liquor to glycerol removal zone to remove glycerol to provide a glycerol free tagatose recycle stream;
   f. returning at least a portion of the glycerol free tagatose recycle stream to be admixed with the isomerized reactor mixture; and,
   g. returning at least a portion of the second raffinate to a first concentration zone to provide a concentrated second raffinate stream and admixing the concentrated second raffinate stream with the feed stream prior to passing the feed stream to the first SMB zone.

22. The process of claim 1, wherein the high purity glucose product stream comprises a glucose purity of greater than about 95 wt-% of total sugar in said glucose product stream.

23. The process of claim 1, wherein the high purity d-tagatose product stream comprises a tagatose purity of form about 90 wt-% to about 99 wt-% of total sugar in said tagatose product stream.

* * * * *